T. Reaney,

Drilling Machine Table.

No. 111,084.  Patented Jan. 17, 1871.

Witnesses: Jno. B. Harding. John Parker

Thos. Reaney
by his atty
Howson and Son

United States Patent Office.

THOMAS REANEY, OF CHESTER, PENNSYLVANIA.

Letters Patent No. 111,084, dated January 17, 1871.

IMPROVEMENT IN TABLES FOR DRILLING-MACHINES.

The Schedule referred to in these Letters Patent and making part of the same.

I, THOMAS REANEY, of Chester, county of Delaware, State of Pennsylvania, have invented an Improved Table for Drilling and other Machines, of which the following is a specification.

Nature and Object of the Invention.

My invention consists of a table, in which are compartments containing a number of balls for supporting plates to be operated on by the tool of a drilling or countersinking-machine, the said balls permitting the plates to be readily and easily adjusted.

Description of the Accompanying Drawing.

Figure 1:
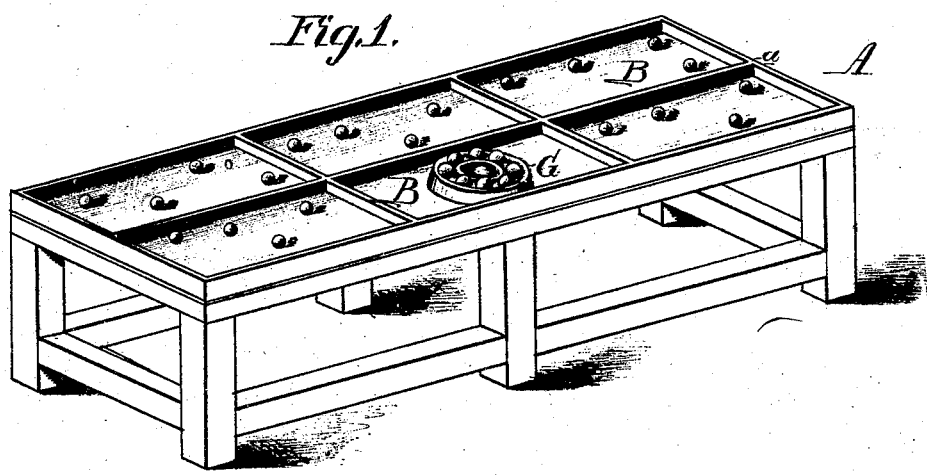
Figure 2:
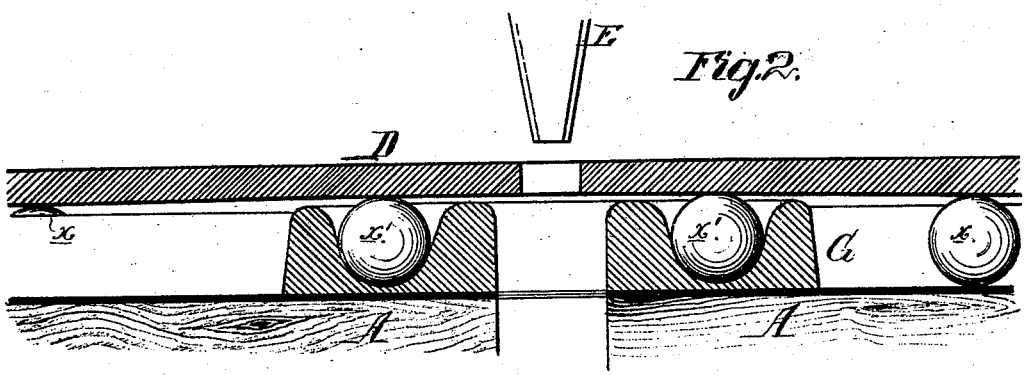

Figure 1 is a perspective view of my improved table for drilling and other machines; and Figure 2, a vertical section of part of the table, drawn to an enlarged scale.

General Description.

In drilling or countersinking holes in large and heavy plates, such, for instance, as those used in constructing the shell of an iron vessel, considerable difficulty has been experienced in moving the plate and adjusting it to a proper position so that the revolving tool will act at the desired point.

This is owing to the large area of the plate, which usually rests on a plain table, causing a friction which interferes with nice and ready adjustment.

The tables have sometimes been furnished with rollers, which render the movement of the plate somewhat easier, but not in all directions, and consequently do not afford facilities for the nice adjustment required.

In order to overcome this difficulty, I form on the table A, by means of suitable ribs $a$, a number of compartments, B, into each of which I place a number of metal balls, the latter supporting the plate above the edges of the ribs so that it can be moved to and fro with the greatest facility in every direction, while the balls are retained within bounds and are prevented from rolling from the table, or from crowding together at one point, by the ribs.

In fig. 2, D represents a plate resting on the balls $x$ $x$; and

E represents a portion of a countersinking tool, carried by the revolving spindle of an ordinary drilling-machine, in which the spindle can be depressed by any of the usual appliances.

Immediately below this tool E, and secured to the table, is a plate, G, having an annular channel arranged concentrically with the said tool, and adapted to a series of balls, $x'$, which are a trifle higher than the balls in the compartments B of the table, so that the plate is certain to bear on the balls in the channel, while those at a distance support the remaining portions of the plate.

By this arrangement of the balls in an annular channel near the countersinking tool, not only is the steadiness of the plate at the proper point insured, but the adjustment of the plate rendered more easy.

The table with its balls may be used as a valuable adjunct to drilling, punching, shearing, and other machines in which the ready adjustment of the plate to be operated on is a desirability.

The table may be made of wood and faced with iron plates, as shown in fig. 2, or may be made entirely of metal.

Claims.

1. The table A, divided on the upper surface into two or more compartments, in each of which lie loosely one or more balls, as and for the purpose set forth.

2. In combination with the subject-matter of the foregoing claim, the annular channeled plate C, and the balls lying loosely therein, as set forth.

In testimony whereof I have signed my name to this specification in the presence of two subscribing witnesses.

THOS. REANEY.

Witnesses:
W. B. REANEY,
P. G. RAM, Jr.